United States Patent
Graue et al.

(10) Patent No.: US 6,494,983 B1
(45) Date of Patent: Dec. 17, 2002

(54) COMPOSITION AND METHOD FOR PROMOTING ADHESION OF THERMOPLASTIC ELASTOMERS TO METAL SUBSTRATES

(75) Inventors: F. William Graue, Downers Grove, IL (US); Joyce M. Scaletta, Blue Island, IL (US)

(73) Assignee: White Cap, Inc., Downers Grove, IL (US)

( * ) Notice: Subject to any disclaimer, the term of this patent is extended or adjusted under 35 U.S.C. 154(b) by 0 days.

(21) Appl. No.: 09/196,367

(22) Filed: Nov. 19, 1998

(51) Int. Cl.⁷ .................. B32B 31/26; B32B 15/08; B05D 3/02
(52) U.S. Cl. ............. 156/307.7; 156/182; 156/307.1; 156/309.5; 156/322; 156/308.2; 156/309.9; 428/418; 428/425.8; 428/458; 428/462; 428/466; 428/521; 427/228; 427/226
(58) Field of Search .................. 428/413, 418, 428/423.1, 423.8, 458, 461, 462, 465, 466, 480, 460, 500, 521; 427/372.2, 384, 386, 445, 228, 226; 156/60, 89.11, 182, 307.1, 307.5, 307.7, 322, 308.2, 309.9

(56) References Cited

U.S. PATENT DOCUMENTS

| 4,478,667 A | * | 10/1984 | Fitko ..................... 156/307.3 |
| 4,997,865 A | * | 3/1991 | Scherping et la. .......... 523/409 |
| 5,244,738 A |   | 9/1993 | Seibel ..................... 428/418 |
| 5,322,863 A | * | 6/1994 | Figge et al. ............... 523/415 |
| 5,491,031 A |   | 2/1996 | Seibel ..................... 428/458 |
| 5,714,264 A | * | 2/1998 | Sacharski et al. ........... 428/413 |

OTHER PUBLICATIONS

Polymer Science Dictionary, Second Edition, Edited by Marc Alger, p. 546, Jan. 1997.*

* cited by examiner

Primary Examiner—Harold Pyon
Assistant Examiner—Michael C Miggins
(74) Attorney, Agent, or Firm—Cook, Alex, McFarron, Manzo, Cummings & Mehler, Ltd.

(57) ABSTRACT

The liner provided metallic shell having an outer-facing surface and an inner-facing surface, said inner-facing surface including a cured enamel coating thereon comprising a solids mixture of an epoxy resin, a phenolic resin, carboxypolyolefin resin and polyester resin; and a shaped thermoplastic elastomer member adhered to said enamel inner surface.

6 Claims, No Drawings

COMPOSITION AND METHOD FOR PROMOTING ADHESION OF THERMOPLASTIC ELASTOMERS TO METAL SUBSTRATES

The present invention relates to compositions for promoting the bonding of shaped thermoplastic elastomer articles to metallic substrates. More particularly, it relates to metallic food container closures specially adapted to use in high temperature filling, sterilization, and retort processing environments, including firmly adherent thermoplastic elastomer sealing gaskets or liners.

Vessel closures for use in food containers include a closure shell formed of either metal or plastic provided with a liner or gasket on the inner facing surface of the closure shell. The liner or gasket provides a hermetic seal between the closure member and the vessel opening. In the past, poly(vinyl chloride)-based liner formulations have been used to provide closure seals. The use of poly(vinyl chloride) resin-based compound liners is currently being discouraged for a number of reasons.

Recently, poly(vinyl chloride) (PVC) resins have received adverse EPA publicity, due to incineration, land fill, and recyclability concerns. PVC resin based plastisols conventionally employed as the closure gasket or liners, now interfere with the recyclability of both the plastic closure shell and the thermoplastic polyester bottle or container.

To overcome the shortcomings with prior art PVC-based liners and gaskets, a search is currently underway to provide substitute non-PVC type liner materials. Early efforts have focused on hot melt compositions, such as those described in U.S. Pat. No. 4,032,492 and 4,085,186. The compositions proposed include rubbery block copolymers based on styrene and butylene or ethyl vinyl acetate copolymers employed in combination with low molecular weight hydrocarbon oils, waxes, plasticizers, and other additives. The hot melt formulations generally possess low melting or softening points ranging from 70° to 125° C. In some food processing and packaging environments and applications, hot filling and pasteurization conditions are frequently carried out at temperatures above 70° to 125° C. Moreover, in hot fill, high retort food filling operations, in addition to elevated temperatures, internal vacuums of as high as 15–26 inches of mercury (Hg) are realized, which cause problems for low temperature softening sealing or gasketing materials. The proposed hot melt compositions generally cannot maintain the compressive set values and cut-through resistance values necessary to provide satisfactory hermetic seals under these high temperature processing conditions.

An additional requirement for liner and gasketing compositions is that they must possess good to excellent adhesion to the closure substrate to minimize the gasket or compound liner movement and cut through during hot fill and retort conditioning. The maintenance of hermetic seals during processing, case packing, shipping, and prolonged storage periods are all essential to successful food packaging.

More recently, it has been proposed to employ thermoplastic elastomer products to provide hermetic sealing structures for various plastic or metallic food vessel closures. Thermoplastic elastomers are thermoplastic processable polymer materials possessing easy processability and rubbery mechanical performance characteristics. Thermoplastic elastomers, often referred to as TPEs, possess a number of processing advantages over earlier rubber materials because thermoplastic elastomers may be extruded and molded to shape and used with little or no extra compounding, vulcanization, or heating steps and the recycling of scrap and the ability to use common plastics processing tools and methods is a distinct advantage. Thermoplastic elastomers possess satisfactory high temperature rubbery performance characteristics to be used as liner gaskets for food closures. However, they are difficult to satisfactorily bond to metal closure materials. For this reason, they have not been readily employed.

Another effort at providing non-PVC based liner and gasketing formulations has been to employ polypropylene polymers and copolymers as the liner compound or gasketing material. Adhesion of the polypropylene liner materials to metal substrates and polymer substrates also ran into some early difficulties. For example, in U.S. Pat. No. 4,034,132, it is disclosed that the adhesion of a propylene polymer to an enamel-coated metal surface such as is provided on a foil pull tab on a container opening is improved by incorporating an adhesion-promoting amount of carboxyl modified polypropylene resin in the metal coating enamel. In U.S. Pat. No. 4,478,677, it is disclosed that the adhesion of a heat sealed polypropylene lined aluminum foil pull tab tape strip to an enamel coated metallic surface and opening, provided with an enamel coating information based on an epoxy resin, an aminoplast resin and a carboxylated polypropylene resin is further improved and made satisfactory by the addition of a butene polymer, such as polyisobutylene, into the enamel coating composition prior to its application to the metal surface.

Other efforts more directly related to bonding thermoplastic elastomer gasketing materials to metal or plastic closures are described in U.S. Pat. No. 5,060,818 wherein adhesion of the TPE gasket to the closure is promoted by incorporating a low temperature melting point liquid paraffin resin and a polypropylene resin into a thermoplastic elastomer formulation prior to injection molding or shaping the elastomer for placement in the vessel closure. Paraffin-modified formulations may be suitable for low temperature packaging operations but they generally cannot be used in high temperature processing conditions because paraffin softens at temperatures of about 250° F.

In addition to modifying the thermoplastic elastomer compositions per se, prior to molding or shaping to form the gasket or liner U.S. Pat. No. 5,060,818 additionally states that if an epoxy phenolic type coating is applied to the surfaces of a metallic closure, the bonding of the line to the inner side of the vessel closure may be promoted by applying a separate layer of an adhesive which contains an oxidized polyethylene resin or an acid modified olefin resin including a carboxyl modified polypropylene resin.

In our laboratories it has been found that the adhesion of shaped thermoplastic elastomer articles to metallic substrates can be improved by the addition of a carboxyl modified polyolefin resin adhesion promoter to an enamel coating composition comprising an epoxy resin and a phenolic resin. Incorporating the carboxylated polyolefin adhesion promoter for TPE materials into the enamel coating composition avoids the need to apply a separate adhesive layer comprising the carboxylated polyolefin resin to obtain satisfactory adhesion of TPE materials. While enamel compositions comprising an epoxy resin, a phenolic resin and carboxylated polyolefin resin provide these advantageous properties, it is desirable to provide coatings based on these resins better flexibility and corrosion resistance.

In accordance with this invention, and to overcome the shortcomings of the prior art arrangements, it is an object of the present invention to provide lidded, stoppered, threaded, capped, or lined metallic closures for vacuum or pressure type products requiring low orders of gas or liquid permeation with a functional hermetic seal.

It is another object of the invention to provide metallic closures provided with liner structures capable of maintaining a hermetic seal under vacuum pressure, pasteurization, hot fill, and retort processing conditions.

It is a further object of the invention to provide new and improved gasketed closures which avoid the use of PVC-based materials.

It is still another object of the invention to provide closures with non-PVC based extrusion or injection processable thermoplastic elastomers which do not require post-vulcanization to impart functional hermetic sealing closure gasket under pasteurization and sterilization conditions.

It is a further object of the present invention to provide thermoplastic elastomer-lined metallic closures exhibiting functional torque release properties.

It is still a further object of the present invention to provide metallic closures with a heat activatable enamel coating which not only promotes adhesion of functional, non-PVC based liner and gasket materials, but also provides a metallic closure exhibiting excellent product and corrosion resistance when subjected to pasteurization, sterilization, and prolonged room temperature storage conditions.

Seibel U.S. Pat. No. 5,491,031 and Japanese Patent No. 86/038744 disclose compositions suitable for promoting the adhesion of plastisols to metal substrates. For example, U.S. Pat. No. 5,491,031 discloses the use of compositions comprising an epoxy novolac resin, a phenolic resin, a polyester and an elastomer while Japanese Patent 86/038744 discloses compositions comprising a polyester resin, carboxyl containing resin and phenol, amino and/or epoxy resin. Neither of these patents disclose a liner-provided vessel closure comprising a metallic vessel closure shell having an outer-facing surface and an inner-facing surface, said inner-facing surface including a cured enamel coating thereon comprising a solids mixture of an epoxy resin, a phenolic resin, carboxypolyolefin resin, and a polyester resin; and a shaped thermoplastic elastomer liner member adhered to said enamel coated inner surface.

The objects of this invention can be attained with a liner provided metallic shell having an outer-facing surface and an inner-facing surface, said inner-facing surface including a cured enamel coating thereon comprising a solids mixture of an epoxy resin, a phenolic resin, carboxypolyolefin resin and polyester resin; and a shaped thermoplastic elastomer liner member adhered to said enamel coated inner-surface. Other things being equal, omission of the carboxypolyolefin resin results in poor adhesion of the cured enamel layer to the shaped thermoplastic elastomer liner member while omission of the polyester resin results in a more brittle enamel layer and reduced corrosion protection of the inner metallic shell.

The solids mixture for forming the cured enamel coating comprises a weight ratio of epoxy resin to phenolic resin of about 1:1 to about 1:5, a polyester resin comprises about 15 to 60 parts by weight per 100 parts by weight epoxy resin and phenolic resin and a carboxypolyolefin resin comprises from about 0.1 to 10 parts by weight per 100 parts by weight epoxy resin, phenolic resin and polyester resin.

In another aspect of this invention, the present invention additionally provides a new and improved method of bonding a shaped thermoplastic elastomer article to a metallic surface which comprises: applying an enamel coating to a metal surface of a substrate, said enamel coating containing a solids mixture comprising a weight ratio of epoxy resin to phenolic resin to about 1:1 to about 1:5, a polyester resin comprising about 15 to 60 parts by weight per 100 parts by weight epoxy resin and phenolic resin and a carboxypolyolefin resin comprising from about 0.1 to 10 parts by weight per 100 parts by weight epoxy resin, phenolic resin and polyester resin; baking the enamel coated substrate at an elevated temperature for a time sufficient to cure and harden the enamel coating composition; heat sealing a shaped thermoplastic elastomer article to the cured enamel coated metal surface; and thereafter, permitting the heat sealed assembly to cool to ambient temperatures.

Epoxy resins useful in this invention include epoxy novolac resin and glycidyl ethers of Bisphenol A.

An epoxy novolac resin useful in the present composition is a polyfunctional epoxy resin having an epoxy functionality of about 2, and preferably greater than about 2, to about 6, and preferably greater than about 2 to about 5. The epoxy novolac resin is a low molecular weight resin having an epoxide equivalent weight (EEW) of about 100 to about 220, and preferably an EEW of about 150 to about 210.

Epoxy novolac resins useful in the present invention include for example, but are not limited to, epoxy phenol novolac resins. Epoxy phenol novolac resins are represented by general structural formula (I) wherein n is about 0.2 to about 4.

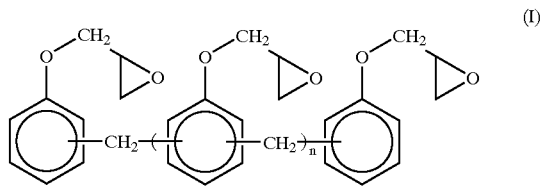

The multifunctional epoxy phenol novolac resin contain a phenolic hydroxyl group per phenyl ring in random parapara', ortho-para', and ortho-ortho' combinations. Epoxidation with epichlorohydrin yields the highly functional epoxy phenol novolac resins. The epoxy phenol novolac resin can be a high viscosity liquid (i.e., n about 0.2) or a solid (i.e., n greater than 3).

Nonlimiting examples of an epoxy phenol novolac resin useful in the present invention are ARALDITE® EPN 1139 available from CIBA-GEIGY Corp., Hawthorne, N.Y. and D.E.N. 431, available from Dow Chemical Co., Midland, Mich. These epoxy phenol novolac resins have an n value (from structural formula I) of 0.2, an EEW of 175 and an epoxy functionality of 2.2, and have provided a useful coating composition that effectively inhibits corrosion of metal substrates. Other nonlimiting examples of epoxy phenol novolac resins are D.E.N. 438 and ARALDITE® EPN 1138, available from Dow Chemical Co. and CIBA-GEIGY Corp., respectively, and having an n value of 1.6, an EEW of 178 and an epoxy functionality of 3.6; and D.E.N. 439 available from Dow Chemical Co. and having an n value of 1.8, an EEW of 200 and an epoxy functionality of 3.8.

Another useful class of epoxy novolac resins is the epoxy cresol novolac resins depicted in general structural formula (II), wherein n is about 1.7 to about 4.4.

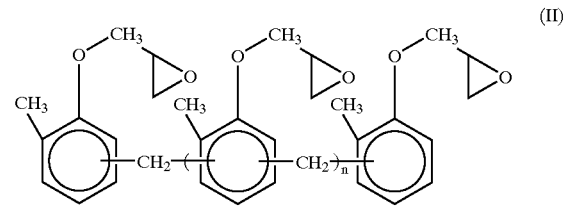

The epoxy cresol novolac resins are prepared by glycidylation of o-cresol-formaldehyde condensates in the same manner as the epoxy phenol novolac resins. The epoxy functionality of the epoxy cresol novolac resins is about 2.7 to about 5.4.

Other useful epoxy novolac resins, i.e., polyfunctional epoxy resins, include but are not limited to a polynuclear phenol-glycidyl ether resin, such as the tetraglycidyl ether of tetrakis(4-hydroxyphenyl)ethane depicted in structural for mula (III), and having an EEW of about 185 to about 210 and a theoretical epoxy functionality of four.

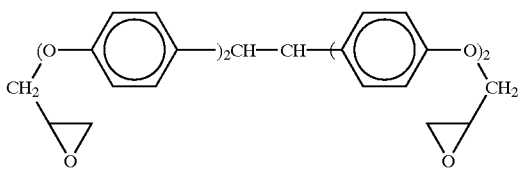

(III)

A tetraglycidylmethylenedianiline resin exemplified in structural formula (IV), as N,N,N',N'-tetraglycidyl-4,4'-diaminophenylmethane, having an EEW of about 117 to about 133 and an epoxy functionality of about 4 also can be used as the epoxy novolac resin.

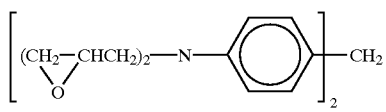

(IV)

In addition, triglycidyl p-aminophenol resins, available from CIBA-GEIGY Corp., and having an EEW of about 105 to about 114 and an epoxy functionality of about 3 can be used as the epoxy novolac resin.

Another exemplary epoxy novolac resin is a triglycidyl isocyanurate depicted in structural formula (V) and having an epoxy functionality of about 3 and an EEW of about 108.

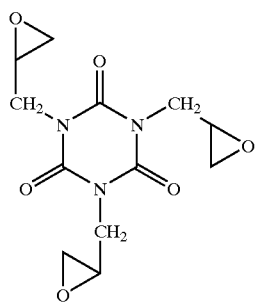

(V)

An epoxy novolac resin provides a sufficient number of crosslinking sites such that a coating composition can be cured and provide sufficient chemical and physical properties for a cured coating composition. A cured coating composition also demonstrates excellent physical properties, such as scratch resistance, adhesion and flexibility. An epoxy novolac resin also provides a sufficient number of crosslinking sites such that a cured coating composition has excellent barrier properties (i.e., exhibits excellent corrosion control).

Glycidyl ethers of Bisphenol A useful in this invention include polymeric reaction products of polyfunctional halohydrins with polyhydric phenols having the structural formula wherein X represents the number of molecules condensed. Typical polyfunctional halohydrins are epichlorohydrin, glycerol, dichlorohydrin, and the like. Typical polyhydric phenols are resorcinol and 2,2-bis(4-hydroxyphenyl) alkanes, the latter resulting from the condensation of phenols with aldehydes and ketones, including formaldehyde, acetaldehyde, propionaldehyde, acetone, methyl ethyl ketone and the like, which result in such compounds as 2,2-bis(4-hydroxyphenyl) propane and like compounds. These epoxy resins normally contain terminal epoxy groups but may contain terminal epoxy groups and terminal hydroxyl groups.

The glycidyl ether of Bisphenol A useful in this invention generally have an average molecular weight in the range of 1400 to 6000 may be used. Preferred resins being the condensation products of epichlorohydrin and Bisphenol A, i.e., 2,2-bis(4-hydroxyphenyl)propane.

Epoxy resins based on glycidyl ethers of Bisphenol A are available commercially. Preferred examples are EPON® 1004 and EPON®1007, products of Shell Chemical Company which are the condensation products of epichlorohydrin and Bisphenol A. For maximum corrosion resistance, high molecular weight epoxy resins sold commercially under the tradename EPI-REZ®565 by Celanese Corporation is especially preferred.

The heat activatable cross-linker resin component for the epoxy resin may be any resin having a polar group which is reactive with the epoxy group, for example a hydroxyl, amino or carboxyl group. For example, phenol/formaldehyde resins, urea/formaldehyde resins, melamine/formaldehyde resins, polar group-containing vinyl resins and polar group-containing acrylic resins may be used singly or in combination.

Of these curing agent resins, the phenol/formaldehyde resins are particularly preferred from the standpoint of adhesion to the substrate, barrier properties with respect to corrosive components, and processing resistance.

The phenol/aldehyde resin component (b) used may be any phenol/aldehyde resin which contains a polynuclear phenol in the resin skeleton.

In the present invention, the term "polynuclear phenol" denotes a phenol having a plurality of rings in which the phenolic hydroxyl groups are bonded. Typical examples of the polynuclear phenols are dihydric phenols represented by the formula:

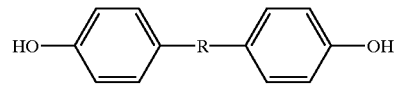

wherein R represents a direct bond or a divalent bridging group. Such phenols are used conveniently for the purpose of this invention. In the dihydric phenols having divalent bridging group R are alkylene groups of the formula —CR$^1$R$^2$— (in which each of R$^1$ and R$^2$ is a hydrogen atom, a halogen atom, an alkyl group having not more than 4 carbon atoms, or a perhaloalkyl group), —O—, —S—, —SO—, SO$_2$— and groups of the formula —NR$^3$ (in which

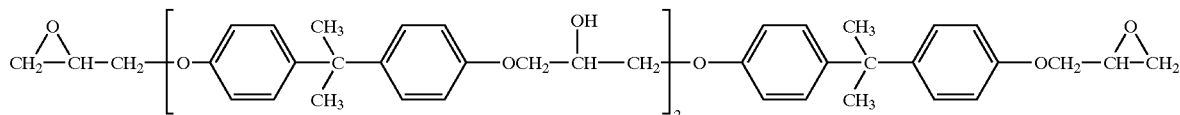

$R^3$ is a hydrogen atom or an alkyl group having not more than 4 carbon atoms). Generally, R is preferably an alkylene group or an ether group. Suitable examples of such dihydric phenols are 2,2-bis(4-hydroxyphenyl)propane (Bisphenol A), 2,2-bis(4-hydroxyphenyl)butane (Bisphenol B), 1,1-bis (4-hydroxyphenyl)ethane, bis(4-hydroxyphenyl)methane (Bisphenol F), 4-hydroxyphenyl ether, and p-(4-hydroxy) phenol. Bisphenol A and Bisphenol B are most preferred.

The polyhydric phenol, either alone or in combination with another phenol, is condensed with formaldehyde to give a phenol/aldehyde resin. Monohydric phenols heretofore used in the production of resins of this type can all be used as a mixture of phenols. Generally, difunctional phenols of the following formula:

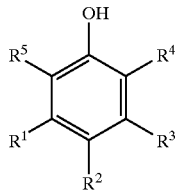

wherein $R^4$ is a hydrogen atom or an alkyl or alkoxy group having not more than 4 carbon atoms, two of the three $R^4$'s are hydrogen atom, and one is an alkyl or alkoxy group, and $R^5$ is a hydrogen atom or an alkyl group having not more than 4 carbon atoms, are preferred. Other phenols such as o-cresol, p-cresol, p-t-butylphenol, p-ethylphenol, 2,3-xylenol and 2,5-xylenol, singly or in combination of two or more, are most preferred. Of course, other phenols such a phenol (carbolic acid), m-cresol, m-ethylphenol, 3,5-xylenol, m-methoxyphenol, 2,4-xylenol and 2,6-xylenol may be used, as well as other difunctional phenols such as p-aminophenol, p-nonylphenol, p-phenylphenol and p-cyclohexylphenol, all of which can be used alone or in combination with the above-mentioned polynuclear phenols in the production of the phenol-aldehyde resins.

Formaldehyde (or paraformaldehyde) is especially suitable as the aldehyde component of the phenol/aldehyde resin. Other aldehydes such as acetaldehyde, butyraldehyde and banzaldehyde may be used singly or in combination with formaldehyde. The phenol/formaldehyde resin used in this invention may be obtained by reacting the aforesaid phenol(s) and aldehyde in the presence of a basic catalyst.

An exemplary phenolic resin utilized in the present coating composition includes about 24% by weight Bisphenol A, and about 7% by weight formaldehyde. This phenolic resin is incorporated into a present coating composition as a solution containing about 50% by weight of the phenolic resin.

The polyester useful in this invention has a molecular weight of about 1,000 to about 50,000, and preferably about 1,000 to about 10,000. To achieve the full advantage of the present invention, the polyester has a molecular weight of about 1,500 to about 6,000. The identity of the polyester is not especially limited. However, it is important that a particular polyester has a sufficiently low molecular weight to impart flexibility to the cured coating composition.

The polyester is prepared by methods well known in the art from a diol, triol, polyol or mixture thereof and a polybasic carboxylic acid or anhydride, or mixture thereof. Examples of diols, triols and polyols include, but are not limited to, ethylene glycol, propylene glycol, glycerol, diethylene glycol, dipropylene glycol, triethylene glycol, tripropylene glycol, neopentyl glycol, pentaerythritol, 1,4-butanediol, trimethylol propane, isopropylidene bis(p-phenyleneoxypropanol-2) and mixtures thereof.

Examples of polybasic carboxylic acids or anhydrides include, but are not limited to, maleic anhydride, maleic acid, fumaric acid, succinic anhydride, succinic acid, adipic acid, phthalic acid, phthalic anhydride, tetrahydrophthalic anhydride, hexahydrophthalic anhydride, endomethylenetetrahydrophthalic anhydride, azelaic acid, sebacic acid, tetrachlorophthalic anhydride, chlorendic acid, isophthalic acid, trimellitic anhydride and mixtures thereof.

A typical polyester useful in this invention is prepared by admixing the following ingredients and heating at about 210° F., then allowing the temperature to rise to about 430° F. until the acid number is about 10.

| Ingredient | % (by weight) |
|---|---|
| Neopentyl Glycol | 33.3 |
| Adipic Acid | 33.7 |
| Isophthalic Acid | 3.6 |
| Trimellitic Anhydride | 4.1 |
| Butyl Carbitol | 21.8 |
| Deionized Water | 3.5 |

The ingredients are mixed, and the resulting mixture is heated until the acid number reached 7.6. The polyester having a weight average molecular weight of about 3000, is present in the mixture in an amount of about 75% by weight nonvolatile material.

The carboxylated polyolefin resin which is utilized in the practice of the present invention is prepared by grafting an unsaturated dicarboxylic acid or anhydride onto an alpha-olefin backbone using high energy radiation or a peroxy catalyst as described in British Patent 1,020,740. Unsaturated dicarboxylic acids or anhydrides which can be employed to prepare the carboxyl modified polypropylene resins include maleic, tetrahydrophthalic, fumaric, itaconic, nadic, and methylnadic acids as well as their anhydrides, maleic anhydride being preferred.

The amount of unsaturated dicarboxylic acid or anhydride which can be grated into the poly(alpha olefin) backbone ranges from about 0.05 to about 10% by weight based on the total weight of the grafted polymer and preferably the amount of grafted dicarboxylic acid or anhydrides ranges from about 0.1 to about 5.0%.

Carboxyl-modified polypropylene resins are preferred as the adhesion-promoting adjuvant for the present enamel coatings. The modified polypropylene resin can be of any particle size and generally has a particle size of 0.05 to 50 microns and preferably a particle size of 35 to 40 microns.

An elastomer can be added to the coating composition to reduce the curing temperature of the enamel. Suitable elastomers include polybutenes, natural rubber, a butadiene-styrene copolymer, a polybutadiene, an isobutylene-isoprene copolymer, a polychloroprene, a polyurethane, an acrylic elastomer, a styrene isoprene copolymer, an acrylonitrile-chloroprene copolymer, a vinyl pyridine-butadiene copolymer and mixtures thereof.

In preparing the enamel coating compositions of the present invention, the epoxy resin, the phenolplast resin and polyester components are dissolved in a solvent blend, such as a mixture of ketones and aromatic hydrocarbons until these components are completely dissolved.

Suitable ketones which can be employed as solvents for epoxy resin-phenolplast resin based enamel coating formulations include methyl ethyl ketone, methyl isobutyl ketone, isophorone, cyclohexanone, diacetone alcohol and diisobutyl ketone. Aromatic hydrocarbon solvents useful as solvents for the epoxy-phenolplast resin based enamel coating formulations include benzene, toluene, xylene, and commercially available aromatic naphtha mixtures, such as Solvesso 100 or 150. An example of a useful ether alcohol is butyl cellosolve and an example of a useful ether alcohol ester is cellosolve acetate.

Antioxidants and thermal stabilizers may also be incorporated in the epoxy resin-phenolplast resin formulation to inhibit oxidation of the carboxyl modified polypropylene resin during the baking and curing of the enamel coating after its application to metal surfaces. Antioxidant compounds which have been found useful in the practice of the present invention include hindered phenolic compounds such as Irganox 1010®, tetrakis[methylene-3-3,5-di-t-butyl-4-hydroxyphenyl) propionate] methane, which are incorporated in the enamel coating formulations at concentrations in the range of about 0.1 to 1.0 percent weight based on the solids content of the enamel. Lubricants, such as low molecular weight polyethylene dispersion, which are required during forming steps in container end closure manufacture may also be incorporated in the enamel composition.

Solid carboxylated polypropylene resin can be added to the organic alcohol, acid or hydrocarbon solvent at a concentration of about 1 to about 30 percent by weight and preferably about 2 to about 10 percent by weight. After the resin is added to the solvent, the mixture is heated to a temperature about 100° C. until the resin completely dissolves in the solvent. The carboxylated polypropylene resin solution is then added to the epoxy/phenolplast resin formulation to prepare the enamel coating composition.

Organic alcohols can be used to prepare solutions of solid carboxylated polypropylene resin for incorporation in the epoxy-phenolplast resin formulations to prepare the enamel coating formulations of present inventions are long chain, saturated and unsaturated, aliphatic monohydroxy alcohols having the general formula R—OH where R is a straight or branched chained saturated or ethylenically unsaturated hydrocarbon group having from 10 to 30 carbon atoms and preferably from 12 to 22 carbon atoms. Illustrative alcohols are decyl alcohol, tridecyl alcohol, lauryl alcohol, tetradecyl alcohol, cetyl alcohol, oleyl alcohol, lineoleyl alcohol, palmitoyl alcohol, arachidyl alcohol, stearyl alcohol, benhenyl alcohol, arachidonyl alcohol, myristoyl alcohol and mixtures of these alcohols.

Organic acids which may be used as solvents for the carboxylated polypropylene resin include saturated and ethylenically unsaturated alphatic acids having 10 or more carbon atoms and preferably 12 to 22 carbon atoms such as the fatty acids as capric acid, lauric acid, myristic acid, palmitic acid, isostearic acid, stearic acid and arachidic acid, undecylenic acid, myristoleic acid, palmitoleic acid, oleic acid, cetoleic acid and uric acid and mixtures of these acids.

Aliphatic hydrocarbons having 10 or more carbon atoms which may be used as solvents for the carboxylated polypropylene resin include saturated hydrocarbons such as kerosene and mineral oil as well as unsaturated hydrocarbons and particularly unsaturated hydrocarbons having olefinic or ethylenic unsaturation such as undecene, tridecene and pentadecene.

The enamel compositions of this invention can be satisfactorily applied at a solids content ranging from about 20 percent to about 70 percent by weight, based on the total weight of the liquid enamel coating composition. Generally, a solids content of 30 to 50 percent by weight is preferred.

The enamel coating composition of the present invention can be satisfactorily applied by any of the conventional methods employed in the coating industry. However, for coating of sheet metal used in container manufacture, gravure of direct roller coating are preferred methods, as the desired coating weight is easily and conventionally applied in a single coat. Spraying, dipping and flow coating are also useful methods of applying the coating dispersion.

After applying the enamel coating, it is cured and hardened by heating the coated substrate at a temperature of about 350° F. to about 500° F. for a period of about 20 minutes to about 1 minutes, the preferred conditions being 8–10 minutes at about 375° F.

The preferred coating weight for coating metal closures is in the range of 1.0 to 6.0 milligrams of dry coating per square inch of substrate surface to provide an enamel surface to which the TPE shaped articles may be heat sealed.

The thermoplastic elastomer materials useful for forming the shaped gaskets or liners heat sealed to the enamel coated metallic closure surface in accordance with this invention included alloyed blends of rubbery copolymers finely dispersed in a matrix of polyolefin as a continuous phase. Illustrative alloyed blends include a polypropylene matrix including ethylene-propylene elastomers, prevulcanized butyl rubber, solid commercially under the tradename Trefsin® from Monsanto Company, ethylene-propylene-dicyclopentadiene rubber (EPDM) sold commercially under the tradenames Vistaflex® and Santoprene® from Monsanto. Other thermoplastic elastomers may include rubbery block copolymers such as triblock copolymers of the general formula ABA, where B is an elastomeric segment and A is a thermoplastic segment, and radial block copolymers of the type having a central hub and a plurality of copolymer chains emanating therefrom having the general formula AB, where B is an elastomeric segment and is attached to the hub, and A is a thermoplastic outer segment, are useable.

These copolymers are characterized by rubber-like properties similar to those of conventional rubber vulcanizates and flow properties similar to thermoplastics at temperatures above the glass transition temperature of the end blocks. The melt behavior of these compounds, with respect to shear and temperature, is similar to the behavior of conventional thermoplastics, but melt viscosities are very much higher than those of either homopolymer of the same molecular weight. Such block copolymers have been shown to exhibit a structure wherein the elastomeric and thermoplastic segments exist in separate phases. As long as the temperature is maintained below the softening point of the thermoplastic blocks, the molecules remain pinned at each end by association of the thermoplastic segments into "domains" which are connected by flexible elastomeric chains. Thus, an elastomeric network is formed with physical cross-links in the place of the chemical cross-links of vulcanizates. When heated above the glass transition temperature of the thermoplastic segments, the domains are broken up and the polymers soften and flow.

In principle, A can be any polymer normally regarded as thermoplastic, e.g. polystyrene, polymethyl methacrylate, polypropylene, etc., and B can be any polymer normally regarded as elastomeric, e.g. polyisoprene polybutadiene, polyisobutylene, polyethylene-butylene, EPDM, etc. In addition to the choice of the blocks, two other parameters influence the physical behavior of these compounds; total molecular weight, and the relative proportion of the two types of segments present and the mechanical properties of the two types of segments present. The mechanical properties of such block copolymers are essentially unaffected by molecular weight changes, however, the viscosities are quite sensitive to total molecular weight changes and this sensitivity is particularly apparent at low shear rates. Since none of these block copolymers exhibit Newtonian viscosity behavior, it is not possible to disclose the range of viscosities of compositions useful in the process of the invention in conventional viscosity units.

Changes in the relative proportions of the thermoplastic and elastomeric segments significantly influence both the mechanical and the flow properties of these block copolymers. As an example, a triblock copolymer wherein A is polystyrene and B is polybutadiene undergoes the following changes when the percent styrene content is varied. With a 13% styrene content, the polymer behaves like an undercured conventional vulcanizate. On increasing the styrene content to 27.5% the behavior of the polymer is closer to that of the conventional vulcanizates. At higher styrene contents (30 to 53 percent) the polymers exhibit a yield followed by drawing and then an elastic extension at even higher styrene content (65%), a very high yield stress is follows by a short draw and immediate break. In addition, as the sytrene content is increased, the viscosity of the polymer goes through a pronounced maximum and then decreases.

In the linear triblock copolymers useful in this invention, A, the thermoplastic segment, is preferably a polymerized alkenyl aromatic compound of average molecular weight within the range of about 2,000 to 30,000. Polystyrene is a preferred material, but polymethylstyrene, polyvinyl toluene, polyvinyl naphthalene, and the like may be substituted therefor. B, the elastomeric segment, is preferably a diene polymerized from starting materials selected from the class consisting of conjugated diene hydrocarbon compounds having four to eight carbon atoms. Elastomeric copolymers of ethylene with propylene may also be useful. B is preferably polybutadiene, polyisoprene, or polyethylene-butylene having an average molecular weight per segment within the range of 10,000 to 200,000. The thermoplastic segments should contribute between about 15 and 65 percent of the molecular weight of the triblock molecule, preferably between 20 and 40 percent. Methods of synthesis of triblock compounds of this type are known to those skilled in the art and many compounds of this type are commercially available from Shell Chemical Company under the tradename Kraton®.

Some of these linear triblock copolymers are subject to a degree of thermal degradation when heated to temperatures above about 150° C. in the present of oxygen. However, this disadvantage can be avoided by heating the copolymers in an inert atmosphere. Thermal degradation is also substantially reduced by incorporating conventional antioxidants in the compositions. The presently preferred triblock copolymers are sold by Shell Chemical Company under the tradenames Kraton G. These are characterized by significantly increased thermal stability and comprise between about 20 to 40 percent styrene and a middle block of a copolymer of ethylene with butylene.

Krayton G-2705®, especially preferred, is a thermoplastic rubber available from the Shell Chemical Company. More specifically, it is a linear triblock copolymer with a center elastomeric block of an ethylene butylene polymer and end block of thermoplastic polystyrene. It supplies rubbery characteristics and film strength to the composition and is more heat resistant than the other triblock molecules.

The preferred TPE materials are also compounded with a torque release improving amount of an unsaturated fatty acid amide. Especially preferred for use as torque release additives are oleylamide and erucylamide added at amounts of 1–5% by weight of the overall TPE composition. Conventional pigments such as $TiO_2$ or fillers such as CaSO, and fumed silicon dioxide (silica) may also be added in conventional amounts.

In accordance with this invention, the TPE gasket is bonded or formed and bonded to the cured enamel coated metallic substrate surface by high temperature extrusion, intrusion molding, injection molding, compression molding, or pre-formed gaskets may be directly bonded by heat sealing at a temperature range of about 350° to 400° F. Heat sealing may be accomplished by any means known to the art, such as a hot platen press or a metal jaws heated by resistance wire or by induction heating, using dwell times varying from 0.1 seconds to 5 seconds.

After the TPE gasket or liner is heat sealed and bonded to the enamel coated material surface, the assembly is allowed to cool to ambient temperature.

Further details regarding the compositions and methods and the attendant advantages provided by the present invention will become apparent from the following illustrative working examples.

EXAMPLE I

Strips of steel plate (8"×30") common to the metal closure industry were roll-coated with an interior primer comprising a 30 wt. percent solid xylene/butyl cellosolve solution of epoxy-phenolic resin described in U.S. Pat. No. 5,244,738, which is hereby incorporated by reference, at a weight of 15 mg/4 $in^2$ and baked for 10 minutes at 400° F. The primed steel plate was top coated with an adhesive enamel composition comprising about 26 to 28 wt. percent resinous solids in ketone/glycol ether/alcohol blend, wherein the resinous components on a dry weight basis comprised 45% phenolic, 22% epoxy-phenolic, 20% polyester, 10% elastomer and 3% carboxylated polypropylene, at 15 mg/4 $in^2$ and placed in an oven for 10 minutes at 380° F. This coated plate was then cut into 4"×1" strips. Samples of the preferred thermoplastic elastomer, specifically styrene block copolymer, and thermoplastic vulcanizate, specifically EPDM/polypropylene, both with a thickness of 0.45" and the same 4"×1" dimensions as the steel strips were placed between two of the coated metal strips with the coated sides facing inward. This test "sandwich" was then placed in a laboratory heat sealer with platen temperatures of 380° F. and clamping pressure of 30 psi for 5 seconds to form a 1"×1" bonded area.

The resulting test parts were then tested by attempting to pull the two metal strips apart at both 90° and 180° to each other. These combinations of adhesive enamel and thermoplastic elastomer or thermoplastic vulcanizate provided bonds that were virtually impossible to separate by hand and which were sufficient to produce functional metal and composite closures as demonstrated by Example II.

EXAMPLE II

A sheet of steel closure stock used in Example I was coated in a commercial metal decorating operation with the following materials in the order listed:

| Coating | Coating Weight | Bake |
| --- | --- | --- |
| Epoxy-urea exterior size coat | 5 mg/4 $in^2$ | 8 minute × 370° F. |
| Epoxy-phenolic interior primer | 20 mg/4 $in^2$ | 10 minute × 400° F. |
| Modified epoxy exterior varnish | 15 mg/4 $in^2$ | 9 minute × 370° F. |
| Epoxy-phenolic-polyester elastomer-carboxylated polypropylene modified used in Example I | 15 mg/4 $in^2$ | 10 minute × 380° F. |

This coated plate was then punched and formed into closure shells using suitable tooling fitted to standard closure manufacturing equipment. Shells for standard lug-style metal closures and shells for state-of-the-art metal/plastic composite closures were prepared in this manner.

Thermoplastic elastomer or thermoplastic vulcanizate sealing gaskets were formed in the closure shells by preheating the shell via induction, convection, or conduction to 330–425° F. and subsequent injection or injection/compression molding of the gasket material to the desired thickness of 0.010–0.020" for the composite closure and 0.005–0.050" for the lug-style closure. The combination of the pre-heated shell and the molten against material activates the adhesive coating to achieve a strong bond between the gasket and the closure.

The completed closures were then applied to glass containers using commercial, automated vacuum sealing equipment. The resulting packages were then evaluated according to standard package performance test procedures.

Package performance testing subjects the test closures to the extremes of mechanical and thermal abuse that can be encountered in commercial use. For example, in this evaluation the packages were sterilized in a pressurized water retort for 60"×273° F. and then subjected to various levels of impact abuse as prescribed by the test procedure. The packages were then monitored for vacuum retention for up to two years.

Adhesion of the gasket to the closure is essential to acceptable package performance under these conditions. Gasket/closure adhesion failure results in leakage and therefore a failed package. In this example, none of the closures incorporating thermoplastic elastomer or thermoplastic vulcanizate gaskets in combination with the adhesive coating technology which is the subject of this invention exhibited gasket adhesion failure. Package integrity as measured by vacuum retention was maintained for the duration of the test.

We claim:

1. A process of bonding a shaped thermoplastic elastomer to a metal surface which comprises the steps of applying an enamel coating to a metal surface of a substrate, said enamel coating containing a solids mixture comprising a solids mixture of an epoxy resin, a phenolic resin, a carboxypolyolefin resin and polyester resin, baking the enamel coated substrate at an elevated temperature for a time sufficient to cure and harden the enamel coating composition, heat sealing a shaped thermoplastic elastomer article to the cured enamel coated metal surface, and thereafter, permitting the heat sealed assembly to cool at ambient temperatures.

2. The process of claim 1, wherein the weight ratio of epoxy resin to phenolic resin is about 1:1 to 1:5, the polyester resin comprises about 15 to 60 parts by weight per 100 parts by weight epoxy resin and phenolic resin, and the carboxy polyolefin resin comprises from about 0.1 to 10 parts by weight per 100 parts by weight epoxy resin, phenolic resin and polyester resin.

3. The process of claim 1, wherein the epoxy resin comprises an epoxy novolac resin.

4. The process of claim 1, wherein the enamel coating composition comprises an elastomer.

5. The process of claim 1, wherein the shaped thermoplastic elastomer comprises a styrene block polymer.

6. The process of claim 5, wherein the styrene block polymer comprises a styrene-ethylene-butylene-styrene block copolymer resin.

* * * * *